United States Patent [19]

Spokas

[11] 4,094,393
[45] June 13, 1978

[54] CLUTCH MECHANISM

[75] Inventor: Romas Balys Spokas, Rockford, Ill.

[73] Assignee: Borg-Warner Corporation, Chicago, Ill.

[21] Appl. No.: 791,370

[22] Filed: Apr. 27, 1977

[51] Int. Cl.² ............... F16D 43/25; F16D 25/08; F16D 13/74

[52] U.S. Cl. ............... 192/82 T; 192/85 AA; 192/85 CA; 192/113 B

[58] Field of Search .......... 192/82 T, 85 AA, 85 CA, 192/113 B

[56] References Cited

U.S. PATENT DOCUMENTS

| | | | |
|---|---|---|---|
| 2,927,563 | 3/1960 | Geiger | 192/82 T X |
| 3,587,537 | 6/1971 | Spokas et al. | 192/82 T X |
| 3,804,219 | 4/1974 | Cummings | 192/82 T |
| 3,848,622 | 11/1974 | Cummings | 192/82 T X |
| 3,927,830 | 12/1975 | Briski | 192/82 T X |

Primary Examiner—Allan D. Herrmann
Attorney, Agent, or Firm—Robert L. Zieg

[57] ABSTRACT

A temperature responsive drive mechanism for an engine accessory adapted to be connected to the oil pressure supply line for the engine and including a fluid circuit which is temperature responsive and requires only two fluid passages to provide for lubrication of the device, return of fluid to the oil sump, and for the actuating pressure supply for the clutch mechanism included in the device.

7 Claims, 10 Drawing Figures

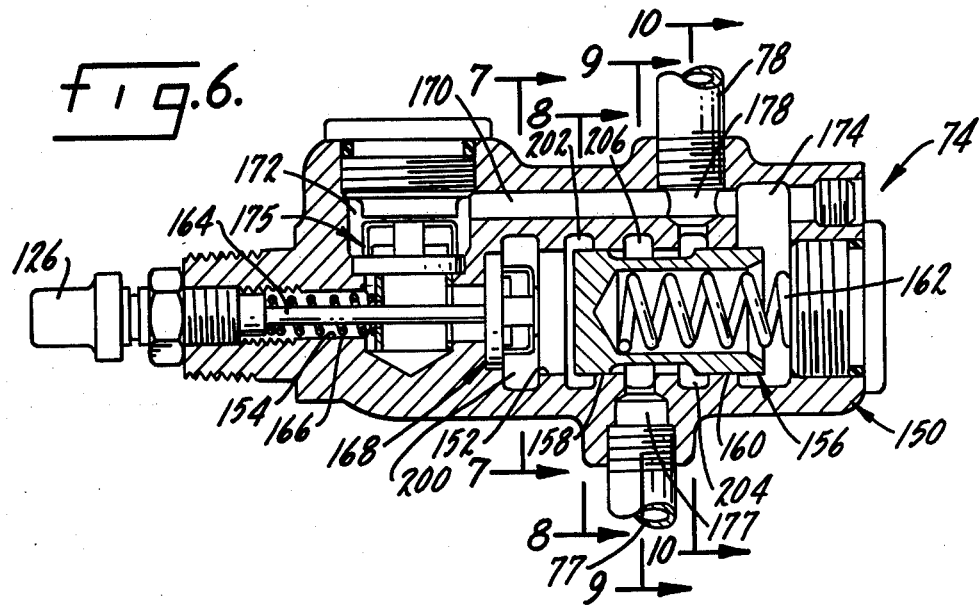
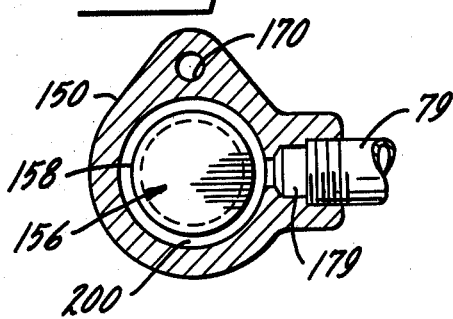
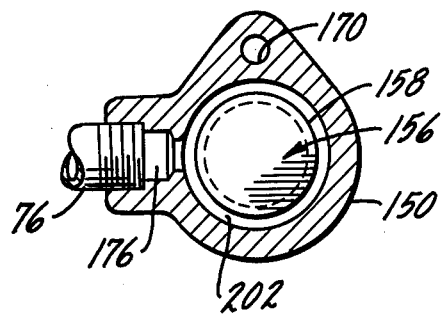
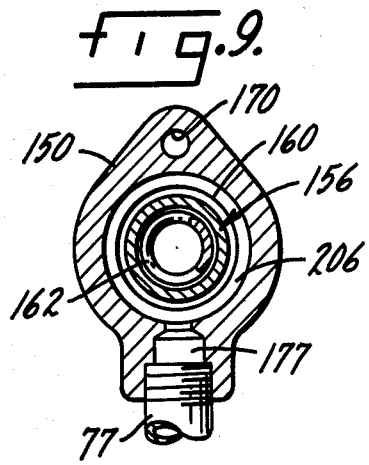
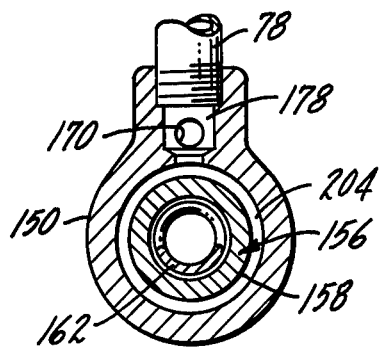

CLUTCH MECHANISM

BACKGROUND OF THE INVENTION

1. Field of the Invention

The present invention relates to means to control a drive mechanism including a clutch and adapted to act in response to the heat in a prime mover such as a vehicle engine and to control drive of a vehicle accessory, such as a fan mechanism, including a controlled response actuator to engage the friction clutch.

2. Prior Art

The problem of controlling heat dissipation devices in connection with a vehicle engine or prime mover so as to keep the prime mover below a predetermined maximum temperature, and at the same time minimizing horse power losses due to operation of the heat dissipation device has resulted in a number of solutions. Prior approaches include those disclosed in U.S. Pat. Nos. 3,804,219 and 3,848,622 of common assignee which show a structure utilizing a separate pressure supply source to provide a temperature responsive and continuously modulated actuation of a clutch mechanism to drive a vehicle fan and the fan speed thus being varied with variations with temperature conditions by controlling continuously the actuating pressure. Other devices known in the art, provide for simple on-off devices, acting in response to temperature to actuate a switch and for shutters in connection with the heat exchange device which may open or close in response to temperature. It has been found that with the simpler devices known as on-off devices the sudden change in engagement or disengagement of the device results in a sudden horsepower loss or gain in the engine which may cause difficulty for the driver of the vehicle. Further, in an attempt to provide for devices which do not allow sudden changes in horse power loss rather complicated structures result which are expensive to manufacture.

SUMMARY OF THE INVENTION

The present invention provides a fluid actuated mechanism to control engagement of the drive to a vehicle fan, for example, in responsive to temperature which is greatly simplified from previous known solutions providing continuously variable drive to the fan, for example, in response to temperature. The present invention has a simplified fluid circuit which is connected to the engine oil supply line for the vehicle engine. The fluid circuit includes an orifice operative to insure proper pressure level to actuate the friction clutch within the drive mechanism, and further, utilizes unique valve mechanism for operating in response to prime mover temperature which will alternate the supply of engine oil pressure to one of two fluid passages to the mechanism whereby alternatively one of the passages acts as a return line and alternatively one acts as a pressure supply line, and whereby only two passages are required to provide for return of fluid from the device, for supply of lubricating fluid to the rotating parts of the device, and to supply the pressure to actuate the clutch in the drive mechanism.

BRIEF DESCRIPTION OF THE DRAWINGS

FIG. 6 is a sectional view of a preferred form of control valve for the mechanism of FIG. 1;

FIG. 7 is a sectional view taken along lines 7—7 of FIG. 6;

FIG. 8 is a sectional view taken along lines 8—8 of FIG. 6;

FIG. 9 is a sectional view taken along lines 9—9 of FIG. 6; and

FIG. 10 is a sectional view taken along lines 10—10 of FIG. 6.

DETAILED DESCRIPTION OF THE PREFERRED EMBODIMENT

Figure 1:
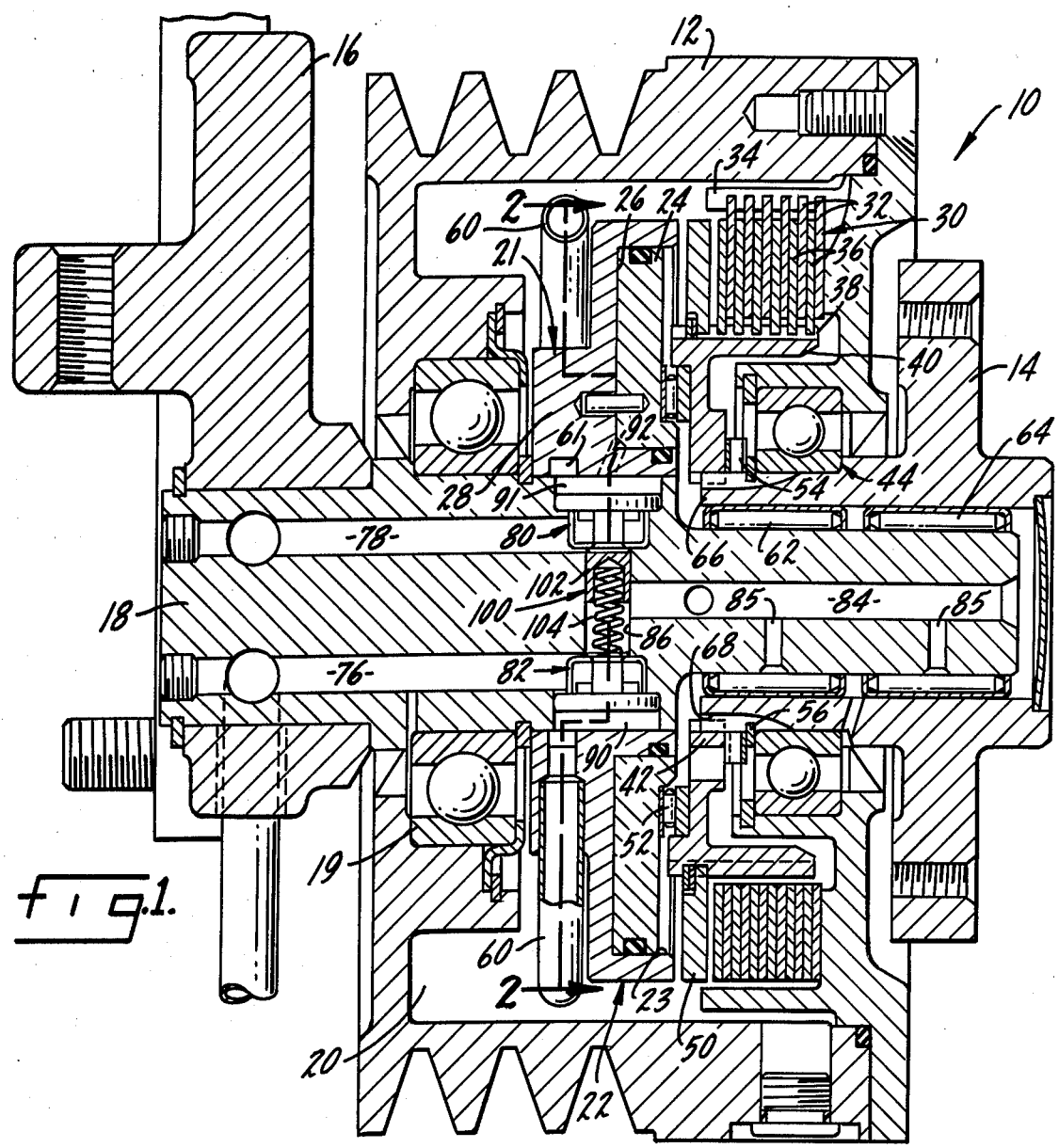
FIG. 1 is a sectional view through a drive mechanism embodying the principles of the present invention.

Referring to FIG. 1, a drive mechanism 10 is illustrated which is operative to drivingly connect a rotatable input member or pulley 12 and a rotatable output member or hub 14. As disclosed herein mechanism 10, is particularly suitable to drive a vehicle accessory such as a cooling fan, and in such construction hub 14 is connected to the fan to drive same.

A stationary bracket or member 16 is provided connected to a vehicle engine in which mechanism 10 is mounted. A stationary shaft 18 is mounted in bracket 16 and upon which the mechanism 10 is rotatably mounted. Member 12 is rotatably mounted on shaft 18 by a ball bearing 19. Member 12 has a cavity 20 in which mechanism 10 is contained.

Non-rotatably mounted on shaft 18 is a cylinder member 21, which comprises a stationary part of an actuator 22 for mechanism 10. Internal of member 21, is a piston member 24 slidable in an annular bore 23 in member 21 forming therewith a fluid chamber 26. An axially extending hub 28 is provided on member 21.

Mechanism 10, includes a friction disc clutch 30 having a plurality of friction discs 32 connected to splines 34 attached to rotary member or pulley 12. Interleaved with discs 32 are a plurality of discs 36 connected to splines 38 on clutch hub 40. Hub 40 has a radial extending flange 42 drivingly connected to fan hub or output member 14. A ball bearing 44 is provided between member 12 and hub 14 to allow relative rotation therebetween. Clutch 30 further includes a pressure plate 50. Actuator piston 24 is movable to the right as viewed in FIG. 1, to move drum 40 and thereby pressure plate 50 and urge the friction discs together to engage the clutch. A rotary thrust bearing 52 is mounted between actuator piston member 24 and pressure plate 50 since member 24 is stationary and drum 40 and pressure plate 50 are rotating. A wave spring 54 is mounted on hub 14 in engagement with drum 40. A retainer 56 comprising a snap ring is secured to drum 40 to retain bearing 44 in place and provide a reaction surface to spring 54 which serves as a return spring for hub 40.

Figure 2:
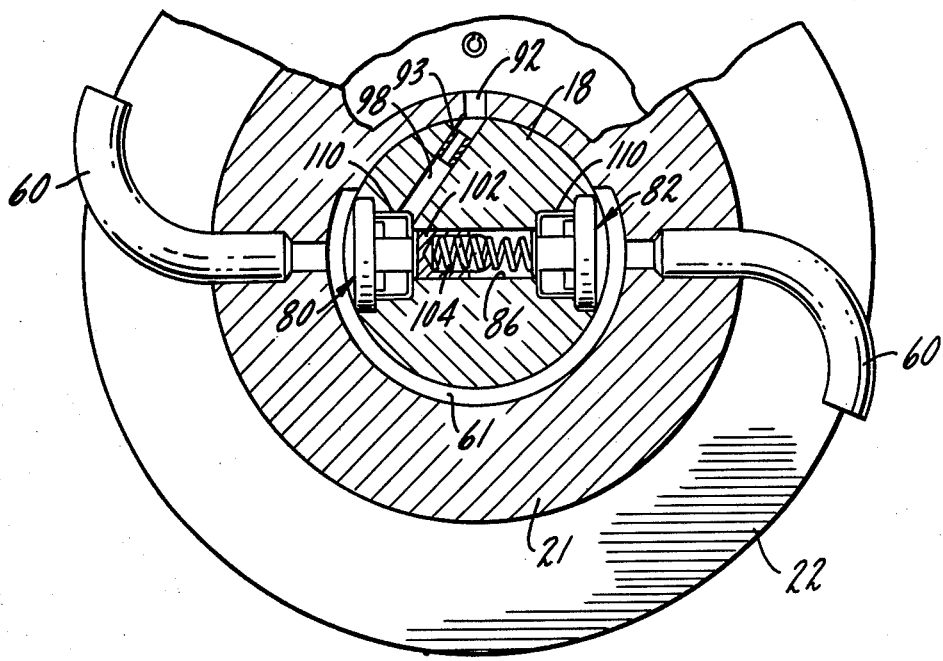
FIG. 2 is a sectional view taken along lines 2—2 of FIG. 1.

As shown in FIGS. 1 and 2 mounted in hub 28 of cylinder member 20 are a pair of Pitot tubes 60 which serve to gather oil in the cavity 20 and supply it to a groove 61 in hub 28 and thus act as an oil return device.

Hub 14 is rotatably mounted on shaft 18 by roller bearings 62 and 64. Hub 14 has an axially extending portion 66 which has splines 68 thereon connected to clutch hub 40.

Figure 3:
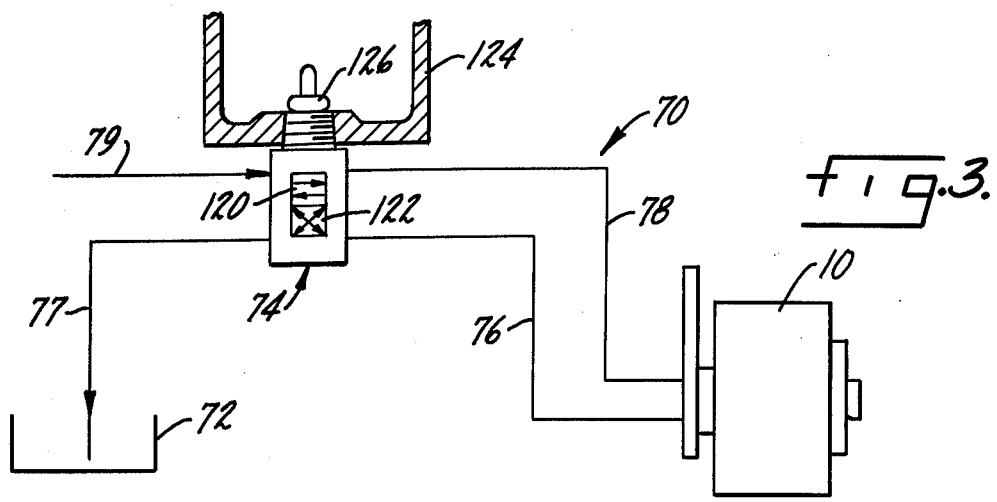
FIG. 3 is a schematic view of a control valve arrangement for the mechanism of FIG. 1.

A fluid circuit is provided for operation of clutch 30. When device 10 is to be used as a drive connection for a vehicle accessory, the fluid circuit provided is adapted to be used with the engine oil supply as the pressure source. As viewed in FIG. 3, the fluid circuit 70 includes a sump 72, thermostatic valve 74, and conduits 76 and 78 interconnecting valve 74 and mechanism 10. A conduit 77 connects valve 74 to sump 72 and a conduit 79 connects vavle 74 to the engine lube oil circuit.

Referring to FIG. 1, conduits 78 and 76 are illustrated within shaft 18. Conduits 78 and 76 are connected to a pair of check valves 80 and 82, respectively. Valves 80 and 82 are illustrated in more detail in FIG. 4, but in general are in the nature of check valves allowing flow of pressure in one direction only.

A fluid exhaust and lube passage 84 is provided in shaft 18 and a cross passage 86 is provided interconnecting conduits 76, 78 and 84. The valves 80 and 82 are mounted within machined seats 90 and 91 in shaft 18. A fluid passage 92 is provided in member 21 connected to fluid chamber 26 for actuator 22. As viewed in FIG. 2 a passage 98 is provided in shaft 18 intercepting passage 78 near the base of valve 80. Passage 98 includes an orifice 93 and is positioned to be in contact with passage 92 so as to be adapted to supply pressure to chamber 26 for actuator 22.

A pressure regulator or relief valve 100 is provided in passage 86 and includes a valve spool 102 and a spring 104. Spring 104 engages spool 102 and the base of valve 82 and urges spool 102 to its upper position as shown in FIG. 1. Each valve 80 and 82 includes a housing 110 and a piston plug 112. As mounted in position in shaft 18, valves 80 and 82 are operative to permit fluid flow from the outer diameter (in the area of seat 90) to the inner diameter of shaft 18 but will block fluid flow from the inner diameter to the outer diameter. For example, in the case of valve 80, fluid pressure in conduit 78 cannot flow from the base of valve 80 outwardly to the groove 61, likewise with fluid pressure in conduit 76. However, fluid pressure in seat cavities 90 or 91 can flow from groove 61 through either of the valves 80 or 82 into passage 78 or 76 as the case may be. A further detail of the valves 80 and 82 is illustrated in FIG. 6.

Figure 4:
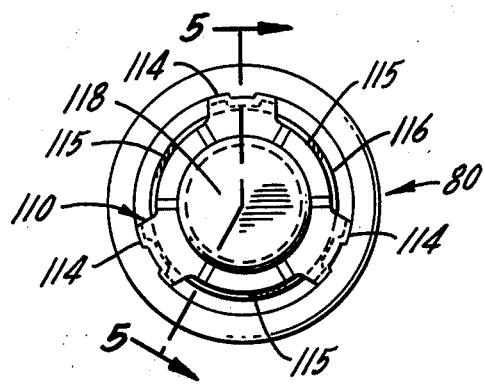
FIG. 4 is a top view of a regulator valve structure used in the mechanism of FIG. 1.
Figure 5:
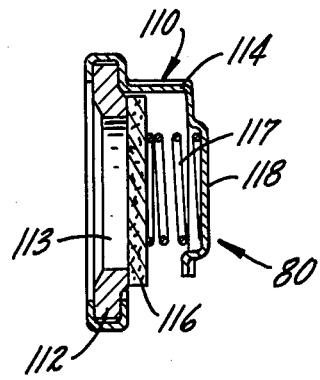
FIG. 5 is a sectional view taken along lines 5—5 of FIG. 4.

Referring to FIGS. 4 and 5 the structure of the valves 80 and 82 is shown in greater detail. A sheet metal housing 110 is provided which is circular and is crimped around a plug 112. Plug 112 has a large central port 113 which will admit fluid. Housing 110 has three legs 114 formed by three apertures 115. Apertures 115 will also admit fluid to the central area of valve 80. Fitting within the inner diameter of housing 110 is a circular sealing member 116. A spring 117 extends between the end portion 118 of housing 110 and sealing member 116. Preferably, sealing member 116 is formed of a non-metallic fibrous material capable of sealing engagement with plug 112.

As will be apparent, if the fluid pressure in port 113 is higher than the force of spring 117 on member 116, the member 116 will move up and admit fluid pressure into the center of valve 80 from which it can flow out through apertures 115. However, if the pressure in the central area of the valve plus the spring force is higher than the pressure force exerted on member 116 by pressure in port 113, sealing member 116 will seat on plug 112 and prevent fluid flow from the central area of valve 80 out port 113.

Thus, valve 80 is a one-way or check valve which can also serve as a pressure relief valve.

Referring again to FIG. 3, thermostatic valve 74 is schematically illustrated as a valve having positions 120 and 122. In position 120, valve 74 will be in a position to connect engine lube oil to conduit 78 and to connect conduit 76 to return line 77 to sump 72. When valve 74 is in position 122, it will connect engine lube pressure in conduit 79 to conduit 76 and will connect conduit 78 to return pressure line 77 to sump 72. Valve 74 is connected to housing 124 of the engine thermostat housing, for example, which will contain the engine coolant. Valve 74 includes a temperature sensitive element or actuator 126 which will be in contact with the engine coolant. The valve 74 thus operates to be in position 120 when the engine is hot and in position 122 when the engine is cool. This operation will be further explained below.

The operation of the mechanism 10 is illustrated, for example, as operative to control engagement and disengagement to the drive of an engine cooling fan. Such control is desired since drive of the cooling fan is not necessary when the engine temperature is below predetermined maximum level and fuel economy and noise levels are both improved when the fan is not being driven, since a substantial part of the engine horsepower may be required to drive the fan mechanism. When the engine is cool, as explained above, valve 74 will be positioned to connect engine lubricating oil to conduit 76. Engine lubricating oil in conduit 76 will flow into passage 86 and 84 out radial passages 85 to lubricate the clutch 30 and other rotating parts. The Pitot tubes mechanism 60 collects fluid in cavity 20 supplied through the lube circuit just described, and returns the fluid collected to groove 61. Pressure in groove 61, as explained above, can flow through check valve 80, into passage 78 and from passage 78 back to the fluid sump through conduit 77. Thus, when the engine is cool the valve 74 is in position 122, chamber 26 is connected to oil flow from Pitot tubes 60 which is not sufficient to overcome the force of wave spring 54 and the clutch is disengaged. A positive lube oil circuit from the engine oil circuit will supply lubricating fluid to the rotary parts of mechanism 10.

However, when the engine temperature reaches the predetermined maximum, element 126 will move valve 74 to position 120. With valve 74 in position 120, the pressure in lube line 79 will be connected to passage 78. This pressure will flow to the end of passage 78 near the base of valve 80 from which it will flow through passage 98, and passage 92 to chamber 26 for actuator 22. Due to the fact that orifice 93 is provided in passage 98, pressure buildup in chamber 26 will be slowed or delayed depending upon the size of orifice 93 and the pressure in conduit 78. However, with a slow buildup of pressure in chamber 26, piston member 24 will move to the right and slowly move pressure plate 50 to engage discs 32 and 36 to slowly engage clutch 30, and pick up drive of hub 14 and the fan connected thereto. As will be apparent, pressure in conduit 78 acts on spool 102 of valve 100 moving same downwardly against the force of spring 104, and thus depending on the size of spring 104, a predetermined maximum pressure will be obtained within passage 78 and actuator 22. As valve plug 102 moves downwardly, when the setting of spring 104 is exceeded, pressure will be supplied into passage 84, to provide lubricant flow for clutch 30. Thus clutch 30 is slowly engaged to provide for drive of the vehicle fan to cool the engine in response to exceeding a predetermined maximum temperature as sensed by element 126 of valve 74.

At the time clutch 30 is engaged, passage 76 now acts as a return fluid passage since fluid will be picked up by Pitot mechanism 60 and flow to groove 61 and seat cavity 90 and through valve 82 to return pressure line 76 since spool 102 has moved down fluid cannot flow from passage 76 to passage 84. If valve spool 102 happens to be in its upper position as could happen if the pressure for some reason would fall in passage 78, the pressure fluid collected in cavity 20 by Pitot tubes 60 will be supplied through passage 86 and passage 84 from the area at the end of passage 76, as described with respect to position of 122 of valve 74 to insure lubrication of the bearings.

In the above description, the valve 74 which is temperature responsive has been described in a schematic manner. Since it will be clear to those of ordinary skill in the art that several solutions may be possible for providing a valve to achieve the function above described of connecting the engine lube oil pressure in conduit 79 to one of the conduits 78 and 76 and alternatively connecting conduit 77 and sump 72 to one of the conduits 76 or 78. In FIG. 6 a prefered embodiment of valve 74 is disclosed in detail. The valve 74 comprises a valve housing 150 having a bore 152 therein and a smaller bore 154.

Slidable in the bore 152 is a hollow piston 156 having lands 158 and 160 thereon. A spring 162 is provided mounted within piston 156 and contacting the end of housing 150 serving to urge valve piston 156 to the left.

As above described attached to housing 150 is a temperature responsive motor 126 which is secured to housing 150 in a manner that the motor 126 is exposed to engine coolant in housing 124. Attached to motor 126 is a rod 164 which is moved by motor 126. Mounted within bore 154 is a return spring 166 for rod 164 which tends to return rod 164 to the left as viewed in FIG. 6. Rod 164 contacts a check valve 168 mounted in the bore 152, the function of which will be described later. The valve 74 has a series of ports which will be described and further includes a horizontal passageway 170 which is connected to a chamber 172 at the left end of the valve and to a further chamber 174 at the opposite end of the valve. A check valve 175 is provided in the chamber 172 for a purpose that will be described. The construction of check valves 168 and 175 is identical to that of valve 80 described above and illustrated in FIGS. 4 and 5.

Cross-sectional FIGS. 7, 8, 9, and 10 of FIG. 6 disclose the various external ports of valve 74. Referring to FIG. 8 a port 176 is provided which is connected to passage 76 of the drive mechanism 10. Referring to FIG. 9, a port 177 is provided which is connected to passage 77 to engine oil sump 72. Referring to FIG. 10 a port 178 is shown connected to passage 78 connected to the drive mechanism 10. Referring to FIG. 7, a port 179 is illustrated connected to passage 79 which is connected to the engine lubrication oil supply.

The operation of valve 74 actuating drive mechanism 10 is as described above with respect to FIG. 3 having a position 120 and a position 122 corresponding to the actuation of the thermally responsive motor 126. In the position illustrated in FIG. 6 the medium of which the temperature is to be sensed is below a predetermined temperature whereby motor 126 is not actuated, and spring 166 has retracted rod 164 whereby check valve 168 will be in a position to operate in response to fluid pressure. Engine oil pressure is received in port 179 and then within a groove 200 within bore 152. Pressure in groove 200 will act on piston 156 to move it to the right against the force of spring 162 and open the pressure in groove 200 to a groove 202. Pressure will not flow through check valve 168 in the direction of bore 154 due to the one-way nature of valve 168 when rod 164 is in its retracted position. Groove 202 is connected to port 176 and thus to passage 76. The oil pressure received in groove 200 will flow through passage 76 and into cross passage 86, piston 102 will be in its upper position as shown in FIG. 1 and connect pressure in passage 86 to passage 84 and out radial passages 85 to lubricate the clutch and the bearings of mechanism 10. As described above Pitot tubes 60 pick up fluid in cavity 20 and return the fluid to passage 78 and port 178 to a groove 204 from which, since piston 156 has moved to the right, it will flow between lands 158 and 160 into a port 206 and to passage 77 and back to sump 72. Pressure at groove 204 can not flow from passage 170 through valve 175 into bore 154 due to the one-way characteristic of valve 175.

When the temperature of the medium in which motor 126 is disposed, exceeds the predetermined maximum temperature such as when the engine is too warm, and the device 10 is to be connected to a cooling fan, motor 126 will actuate rod 164 moving same to the right against the force of spring 166 and opening check valve 168. With check valve 168 open, fluid pressure received from the engine lube circuit from passage 79 and port 179 can now flow from port 200 into bore 154 chamber 172, passage 170, into port 178 and passage 78. As described above, fluid pressure in passage 78 will actuate clutch 30 to engage the drive to reduce the temperature of the engine. At this time the pressure in conduit 170 also will be conducted to the chamber 174 at the right end of the housing 150 and insure that the piston 156 has pressures equalized thereon, whereby spring 162 will move piston 156 to the left and interconnect grooves 202 and 206. At this time passage 76 is being supplied by return fluid pressure Pitot tubes 60. Then return pressure will be supplied through port 176 and groove 202 to groove 206 for port 177 since the piston 156 is now in its position to the left, and the return fluid pressure is again connected to the sump through port 177 and conduit 77.

From the above it will be seen that the unique valve mechanism illustrated in FIG. 6, comprises an efficient and relatively simple means of switching the engine oil supply pressure between passage 76 and 78 as is necessary to provide for actuation of the drive mechanism 10 or alternatively for positive lubrication of the mechanism 10 when the clutch 30 of mechanism 10 is not to be actuated. By use of the check valves 168 and 175, it is assured that the piston 156 will be properly positioned to make the necessary connections between passages 77, 79, 76 and 78.

In addition to the above advantage, the present construction provides a unique and simplified way of utilizing the engine lubrication oil circuit of an engine as the pressure actuating supply for the clutch mechanism. Proper pressure is insured to actuate the clutch mechanism by the use of the pressure regulator valve 100 in the fluid circuit to provide a buildup of pressure. Instant on and off engagement of clutch 30, which could result in sudden changes in engine available horsepower, is prevented by use of orifice 93 to provide for slow engagement and disengagement of clutch 30. For the reasons pointed out above, the present invention comprises a unique and novel method of controlling and operating a friction clutch device for thermostatically responsively engaging and disengaging the clutch to drive or disconnect the drive to a cooling device.

I claim:

1. A temperature responsive drive mechanism comprising a driving member and a driven member, a friction clutch connected between said members adapted to provide a releasable coupling therebetween, an actuator mechanism associated with said members and adapted to engage said clutch in response to fluid pressure, a source of pressure and a sump for said mechanism, a fluid for connecting a said source to said actuator, said fluid circuit including a valve having temperature responsive means exposed to a medium of varying temperature, said valve having two positions, a pair of fluid passages connecting said drive mechanism and said valve, said valve being connected to said source, one of said passages connected to said actuator to supply pressure thereto, said valve being operative to alternatively connect said source to either of said conduits connected to said drive mechanism and to alternatively connect said conduits to a return passage to said sump, whereby one of said passages will supply pressure to the actuator to engage the clutch when supplied with fluid pressure by the valve when the temperature of said medium exceeds a predetermined maximum, and the other of said passages when supplied with pressure providing lubricant supply to said drive mechanism when said valve is the other position and said medium is below a predetermined temperature; said pair of passages alternatively acting as return fluid passages when the other passage is connected to said source.

2. A drive mechanism as claimed in claim 1 wherein said members include a cavity therebetween in which said clutch is mounted, and including a pair of check valves between said passages and said cavity whereby fluid pressure can be returned from said cavity into said passages through said check valves and fluid pressure in said passages can not flow through said check valves to said cavity.

3. A mechanism as claimed in claim 1, wherein a pressure regulator valve is provided connected to the actuator, whereby a predetermined minimum pressure will be maintained when said passage is connected to said source of pressure, to provide proper pressure levels for operation of the clutch mechanism.

4. A temperature responsive drive mechanism comprising a driving member and a driven member, a friction clutch connected between said members adapted to provide a releasable coupling therebetween, an actuator mechanism associated with said members and adapted to engage said clutch in response to fluid pressure a source of pressure and a sump for said mechanism, a fluid circuit for connecting said source to said actuator mechanism, said fluid circuit including a valve having temperature responsive means exposed to a medium of varying temperature, said valve having two positions, a pair of fluid passages connecting said drive mechanism and said valve being connected to said source, one of said passages connected to said actuator to supply pressure thereto, said valve being operative to alternatively connect said source to either of said conduits connected to said drive mechanism and to alternatively connect said conduits to a return passage to said sump, whereby one of said passages will supply pressure to the actuator to engage the clutch when supplied with fluid pressure by the valve when the temperature of said medium exceeds a predetermined maximum, and the other of said passages when supplied with pressure providing lubricant supply when said valve is in the other position and said medium is below a predetermined temperature, said pair of passages alternatively acting as a return fluid passage when the other passage is connected to said source, said members including a cavity therebetween in which said clutch is mounted, a pair of check valves between said passages and the cavity for said clutch mechanism whereby fluid pressure can be returned from said cavity into said passages through said check valves and fluid pressure in said passages can not flow through said check valves to said cavity, and a pressure regulator valve connected to the actuator mechanism whereby a predetermined minimum pressure will be maintained when said passage is connected to said source of pressure, to provide proper pressure levels for operation of the clutch mechanism.

5. A temperature responsive drive mechanism for a vehicle engine cooling fan comprising a driving member and a driven member, said driven member connected to said fan, a friction clutch connected between said members adapted to provide a releasable coupling therebetween an actuator mechanism associated with said members and adapted to engage said clutch in response to fluid pressure, said engine having a source of pressure and a sump, a fluid circuit for connecting said source to said actuator mechanism said fluid circuit including a valve having temperature responsive means exposed to a medium having a temperature varying with engine temperature, said valve having two positions, a pair of fluid passages connecting said drive mechanism and said valve, said valve being connected to said source, one of said passages connected to said actuator to supply pressure thereto, said valve being operative to alternatively connect said source to either of said conduits connected to said drive mechanism and to alternatively connect said conduits to a return passage to said sump, whereby one of said passages will supply pressure to the actuator to engage the clutch and drive the fan when supplied with fluid pressure by the valve when the engine temperature exceeds a predetermined maximum, and the other of said passages when supplied with pressure providing lubricant supply to said drive mechanism when said valve is in the other position and said engine is below a predetermined temperature; said pair of passages alternatively acting as return fluid passages when the other passage is connected to said source.

6. A drive mechanism as claimed in claim 5 wherein said members including a cavity therebetwen in which said clutch is mounted, and including a pair of check valves between said passages and the cavity for said clutch mechanism whereby fluid pressure can be returned from said cavity into said passages through said check valves and fluid pressure in said passages can not flow through said check valves to said cavity.

7. A mechanism as claimed in claim 5, wherein a pressure regulator valve is provided connected to the actuator, whereby a predetermined minimum pressure will be maintained when said passage is connected to said source, to provide proper pressure levels for operation of the clutch mechanism.

* * * * *